United States Patent
Glynn (10) Patent No.: US 6,775,720 B1
(45) Date of Patent: Aug. 10, 2004

(54) METHOD AND SYSTEM FOR CONFIGURING A MASS STORAGE SYSTEM FOR MEASURING SYSTEM PERFORMANCE

(75) Inventor: William Glynn, Sherborn, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/542,171

(22) Filed: Apr. 4, 2000

(51) Int. Cl.$^7$ .............. G06F 3/00; G06F 3/02; G06F 3/023; G06F 3/05; G06F 3/06

(52) U.S. Cl. .............. 710/38; 710/18; 710/15; 710/60; 711/111; 711/114

(58) Field of Search .............. 710/20, 21, 22, 710/60, 110, 305, 306, 312, 314, 244, 36–38, 42, 43, 15–19; 709/216, 213; 711/111, 112, 114, 117

(56) References Cited

U.S. PATENT DOCUMENTS

| | | | | |
|---|---|---|---|---|
| 5,568,629 A | * | 10/1996 | Gentry et al. .............. | 711/113 |
| 5,689,678 A | * | 11/1997 | Stallmo et al. .............. | 711/113 |
| 5,802,547 A | * | 9/1998 | Legvold .............. | 711/100 |
| 5,892,955 A | * | 4/1999 | Ofer .............. | 710/241 |
| 5,895,493 A | * | 4/1999 | Gatica .............. | 711/147 |
| 5,898,863 A | * | 4/1999 | Ofer et al. .............. | 395/500 |
| 5,953,689 A | * | 9/1999 | Hale et al. .............. | 702/186 |
| 6,108,684 A | * | 8/2000 | DeKoning et al. .............. | 709/105 |
| 6,341,317 B1 | * | 1/2002 | D'Errico et al. .............. | 710/15 |
| 6,347,358 B1 | * | 2/2002 | Kuwata .............. | 711/113 |
| 6,434,637 B1 | * | 8/2002 | D'Errico .............. | 710/38 |

* cited by examiner

Primary Examiner—Paul R. Myers
Assistant Examiner—Raymond N Phan
(74) Attorney, Agent, or Firm—Hale and Dorr LLP (57) ABSTRACT

A method for measuring mass storage system performance in which a mass storage system has a plurality of disk drive storage elements controlled by a disk drive controller, the controller typically having a cache memory, and the controller receiving commands and data from and returning at least data to a plurality of host computers, provides the flexibility of issuing commands to the controller in different balanced configurations from a plurality of hosts in an organized fashion. The configurations exhibit hierarchical and marginal balance.

12 Claims, 6 Drawing Sheets

FIG. 4
BACK-END HIERARCHY

FRONT-END HIERARCHY
FIG. 5

FIG. 6

METHOD AND SYSTEM FOR CONFIGURING A MASS STORAGE SYSTEM FOR MEASURING SYSTEM PERFORMANCE

BACKGROUND OF THE INVENTION

The invention relates generally to tools for measuring the performance of mass storage systems, and more particularly, to a method and apparatus for measuring the performance of a system having a plurality of the disk drive elements controlled through a disk drive controller connected to a plurality of host computers.

As the size and complexity of computer systems increase, including both the number of host computers and the number and size of disk drive elements, it becomes increasingly important to measure and understand the functions and parameters which affect the performance of the system. The performance of the system can be typically measured in terms of input/output (I/O) response times, that is, the time it takes for a read or write command to be acted upon, as far as the host computer is concerned, by the disk drive controller system.

It is well known, in the field, to measure, usually using a single parameter, the instantaneous or average response time of the system. Typically, a host computer outputs one or more I/O requests to the disk drive controller, and then measures the time for a response to be received from the disk drive controller. This time duration, while representative of the response of a specific read or write command to the disk drive system, is most often not representative of the actual performance which can be obtained from the system.

A similar distortion, not representative of system performance, can occur when average response time values are determined. For example, a disk controller, using a cache memory in its write process, can have substantially different write time responses depending upon the availability of cache memory. An average response (the average of, for example, a write where cache was available and one where cache was not available) would be misleading and meaningless.

The performance of a large storage system is particularly difficult to measure since more than one of the host computers, which connect to the disk drive controller(s), can operate at the same time, in a serial or in a parallel fashion. As a result, a plurality of disk drive elements, usually arranged in a disk drive array, operating in either an independent fashion, a RAID configuration, or a mirrored configuration, for example, can have a significant yet undetectable bandwidth or operational problem which cannot be addressed, or discovered, when commands are sent only from a single host computer.

When running the performance tests on a system such as the EMC symmetrix storage system, one is usually interested in determining the maximum performance of components of the system, such as a host adaptor or SCSI adaptor (SA), a host adaptor port, a disk adaptor (or DA) etc., as well as the performance of the entire system. When testing a component, such as an SA port, it is desirable that the I/Os to and from the host adaptor be spread out across the back end components, that is, across the DA's, DA processors, DA ports, disks, and hypers, so that the SA port performance measured is not constrained by some other component in the system. The phrase-used to describe this situation is "narrow in the front and wide in the back". Similarly the phrase "narrow in the back and wide in the front" describes the case where one wants to measure the performance of a back end component, such as a DA disk drive, etc., unconstrained by the front end.

SUMMARY

The invention relates to a method for measuring the system performance of a mass storage system having a plurality of disk drive storage elements controlled by a disk drive controller. Typically the disk drive controller has a cache memory. The controller receives commands and data from, and returns at least data to, a plurality of host computers.

The method relates, therefore, to configuring a mass storage system for measuring system performance, and for improving such performance. The system includes a plurality of disk storage elements, each element having at least one hyper, and connected to a disk storage controller. The disk storage controller is connected to at least one of the host computers defining a plurality of logical units (LUN's), the storage controller being defined in its configuration by a front-end hierarchy and a back-end hierarchy. The method features balancing assignments of LUN's across the back-end hierarchy, and marginally balancing the assignments of disk drive elements and hypers of the drive elements across the back-end hierarchy.

The method, in an alternate aspect, features balancing assignments of components of the back-end hierarchy to LUN's of the front end hierarchy, and marginally balancing those assignments.

In particular embodiments of the invention, the method of marginally balancing the disk drive elements features monitoring a first set of drive numbers with counts equal to the minimum for the entire system, monitoring a second set of disk numbers with assignment counts equal to a minimum across a first disk adaptor port to be assigned, the disk adaptor port being in the back-end of the storage controller hierarchy, and selecting, if possible, a disk drive from an intersection of the first and second sets.

In another aspect, the invention relates to software stored on a computer readable medium to perform the function of configuring a mass storage system for measuring system performance, this system having a plurality of disk storage elements, each element having at least one hyper and connected to a disk storage controller, the disk storage controller being connected to at least one host computer and the host computer defining a plurality of logical units. The storage controller defines its configuration in a front-end hierarchy and a back-end hierarchy. The function features balancing assignments of LUN's across the back-end hierarchy and marginally balancing assignments of disk drive elements and hypers of the disk drive elements across the back-end hierarchy. In a particular embodiment of the invention, when the marginal balancing function does not maintain a marginal balance across the hypers, the software further features the function of marginally balancing based solely upon the hypers of the disk drive elements across the back-end hierarcy.

Advantageously, therefore, the system provides statistics describing the dynamic performance of components of the mass storage system, from the host adaptor ports to the disk drive elements and hypers, by achieving a balanced operation so that other system components do not constrain or adversely affect the component being tested. The method and apparatus of the invention further advantageously enable the user to configure a balanced configuration to enable the dynamic performance of the system component to be repeatedly enabled and tested for consistent performance.

BRIEF DESCRIPTION OF DRAWINGS

Other features and advantages of the invention will be apparent from the following description, taken together with the drawings, in which.

DETAILED DESCRIPTION

Figure 1:
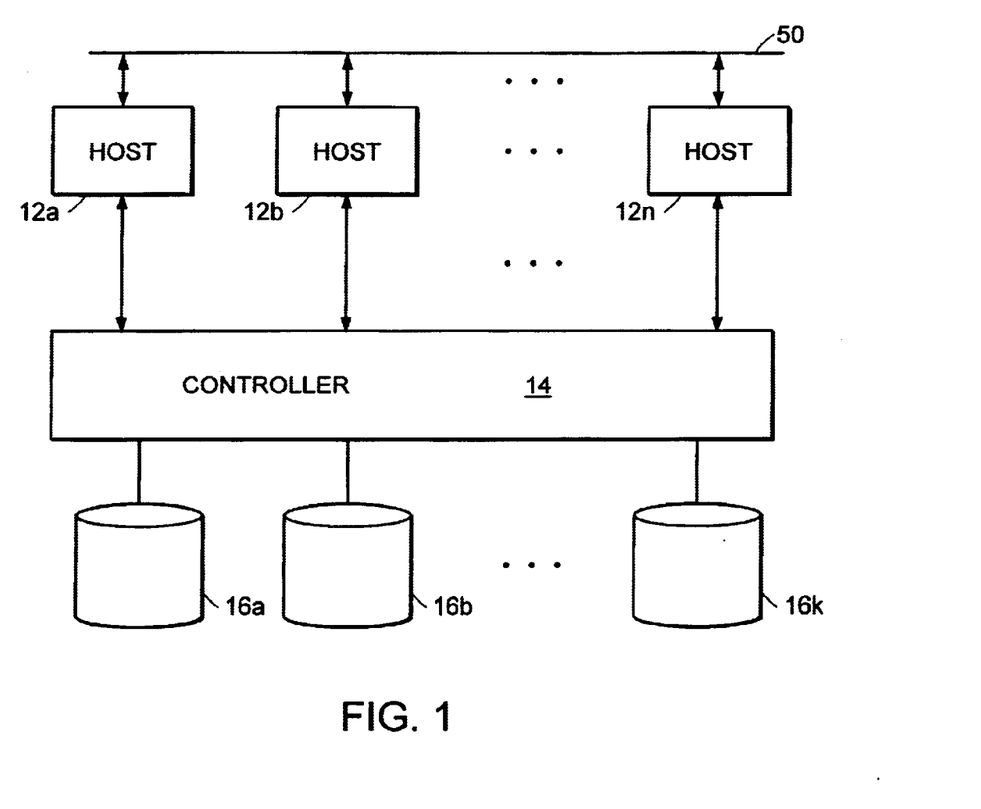
FIG. 1 shows a typical system in which the invention is useful.

Referring to FIG. 1, the invention relates to a computer system wherein a plurality of host computers or processors 12a, 12b, . . . , 12n, connect to a storage controller system 14, such as the EMC Symmetrix® storage system. The controller acts as the interface between the host computers and a plurality of mass storage devices, such as, for example, disk drive elements 16a, 16b, . . . , 16k. Data written by the host or read from the disk drive elements passes through the memory controller system which acts as a two way communications path with substantial capabilities. The disk drive elements can have any of, or a combination of, a plurality of configurations. For example, in some systems, the data from a host is uniformly striped across all of the disk storage devices; and in other systems, the data from a host is stored on the disk drives 16 according to a RAID protocol or an n-way mirrored protocol. In yet other embodiments of the invention, all of the data from a particular host can be stored in a logical volume on a single disk drive or allocated to different logical volumes of the same or different disk drives, depending upon the nature and the source of the data and host. A host computer can also read data from one or more of the disk drive units to generate a single host logical volume.

To determine the limits of performance in the system, the hosts can, according to the invention, be operated to exercise and test the controller and its connected disk drive elements. Thus potential problems which can create a bottleneck on those communication lines connected from the disk drive controller to either the disk drive elements or the hosts can be identified, as can cache memory loading issues in the drive controller.

Figure 2:
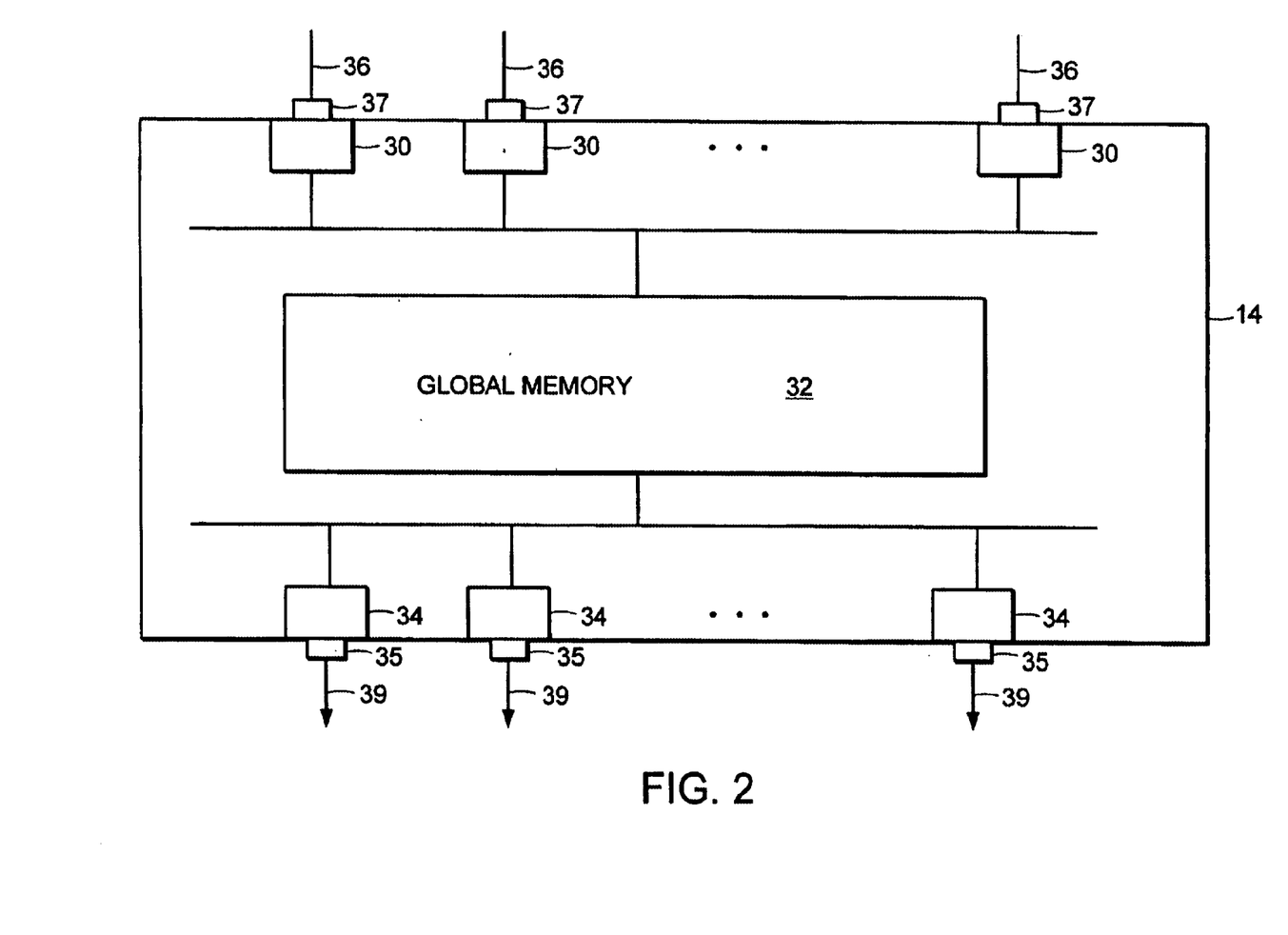
FIG. 2 shows, in more detail, a particular controller system in which the invention finds particular use.

Referring to FIG. 2, in a particular embodiment according to the invention, the disk controller has a plurality of host adaptors (also referred to as channel directors, fiber adaptors (FA's) or SCSI adaptors (SA's) 30 connecting to a global memory 32 through which, in this embodiment, all data and commands flow. The global memory 32 is connected to a plurality of disk adaptors (also referred to as DA's or disk directors) 34 which connect to the disk drives 16, at storage or drive ports 35 of the adaptors 34, over lines 39. Each disk adaptor can have two or more processors operating therein. In accordance with this particular embodiment of the invention, each host adaptor has a SCSI adaptor embedded therein which communicates with the global memory 32. Each host adaptor connects to one or more host computers over buses 36 at host adaptor ports 37 of the host adaptors. The host processors also can communicate with each other, for example over a SCSI bus 50 (FIG. 1). Thus, in the illustrated embodiment, the read and write operations pass from a host computer, through a port of a SCSI adaptor unit 30, through a cache memory 32, to a disk adaptor, over a port 35, to the disk drive elements.

Figure 3:
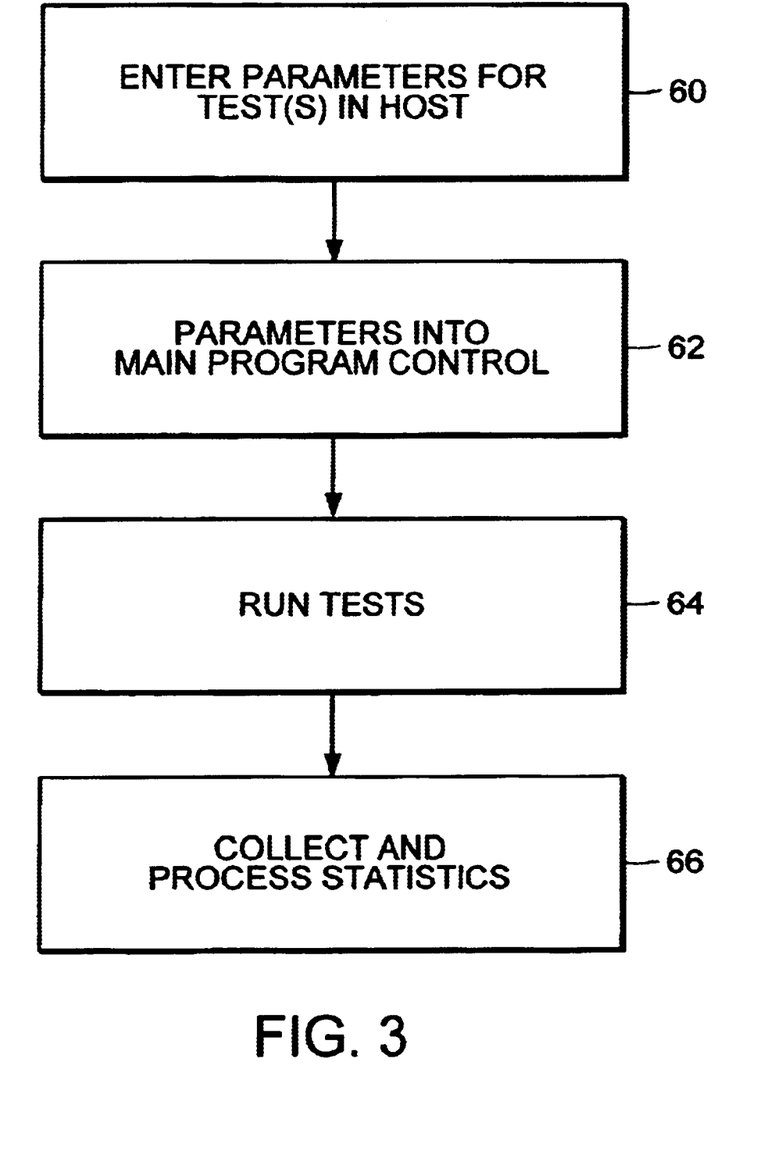
FIG. 3 is a flow chart showing overall operation of the system.

Referring now to FIG. 3, in general operation, a series of arguments or parameters describing the test or tests to be performed within the mass storage system is entered into a master host processor (step 60). The parameters, represented by the data entered into the master host processor, will define and effectively control the operations by which the hosts gather statistics describing performance of the mass storage system. The arguments or parameters data are entered into a main control program (step 62). Once the parameters are set in the main control program, operation transfers (at 64) to a main driver program, running on the master host computer. The driver program controls operation not only of the master host computer, but of all of the other (client) host computers as well. At the completion of test operation, the resulting statistics are collected and processed (at 66).

Figure 4:
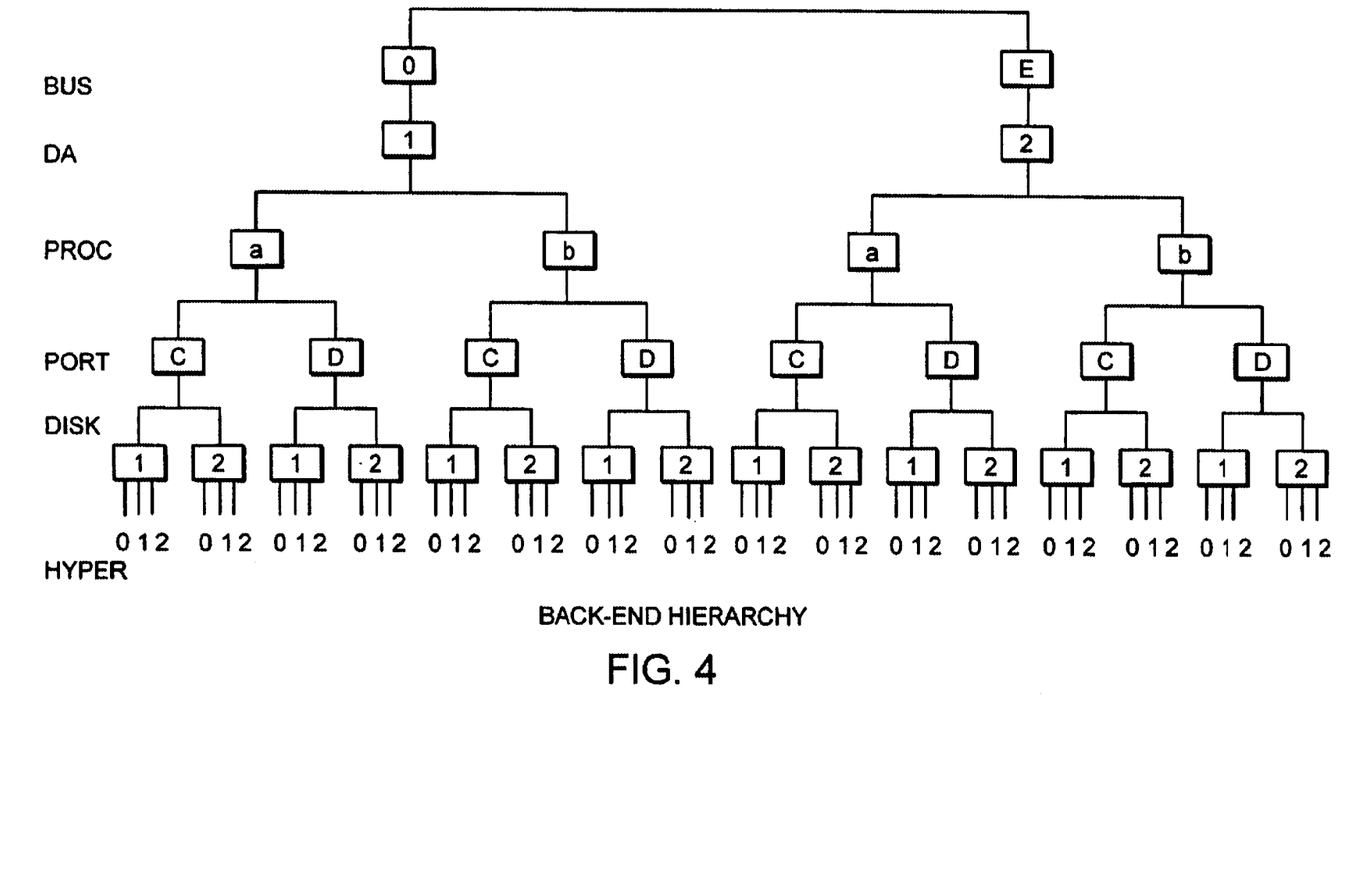
FIG. 4 shows a back-end hierarchy of the system.
Figure 5:
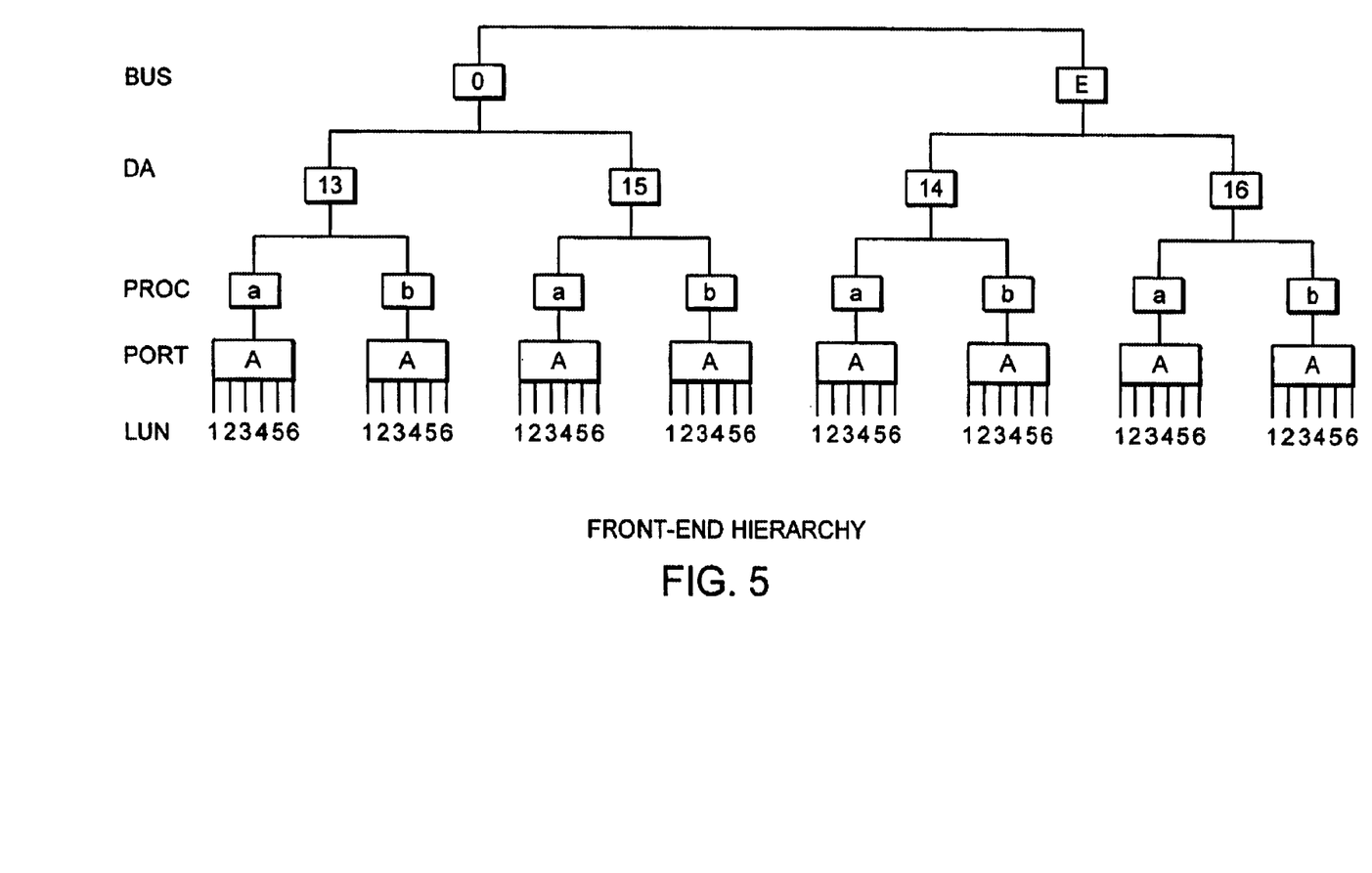
FIG. 5 shows a front-end hierarchy of the system.

The invention relates to the automatic setting of the parameters and system configuration for determining the performance of a component of the storage system. Both the front-end and back-end components of the storage system can be thought of as a hierarchical structure. FIGS. 4 and 5 represent the back-end and front-end hierarchies, respectively, for a hypothetical system, which will be used to provide a basis to discuss the inventive method. There is nothing unique about this storage system, except that each half, the front-end and back-end component hierarchies, is small enough to be represented on a single page of drawing. The method of the invention assumes that all the components at a given level of the front-end or back-end hierarchy are equivalent, that is, each DA has the same number of processors, each processor has the same number of ports, etc. Otherwise, it is not clear what a balanced configuration would mean. With this limitation in mind, the method is quite general.

FIG. 4 shows that the back-end of the example system has 2 buses labeled O for odd and E for even. There is a single DA on each bus, DA 1 on the odd bus and DA 2 on the even bus. Each DA has 2 processors, a and b; each DA processor has 2 ports, C and D; each DA port has 2 disks, 1 and 2; and each disk has 3 hypers, 0, 1, and 2. Similarly, FIG. 5 shows the front-end components of the example system to include, in this embodiment, 2 buses, odd and even; 2 fiber adaptors (FAs) per bus, 13 and 15 on the odd bus, and 14 and 16 on the even bus; 2 FA processors per FA, a and b; 1 FA port per FA processor, A; and 6 logical units (LUNs) per FA port, 1, 2, 3, 4, 5, and 6. The cache memory, not shown, connects to each of the odd and even buses of the front-end and back-end hierarchies.

Configuring the system then requires defining a mapping from the LUNs to the hypers. The front-end is balanced if the LUNs associated with any front-end component, such as an SA or FA port, are mapped as uniformly as possible across the levels of the back-end hierarchy. The back-end is balanced if the hypers associated with any back-end component, such as a DA processor, are mapped as uniformly as possible across the levels of the front-end hierarchy. The system is said to be balanced if both the front-end and back-end are balanced. In addition to balancing the system across the front-end or back-end hierarchy, it is necessary to be concerned about balance across the hypers and, to a lesser extent, across the disks, apart from the overall hierarchy. That is, performance can vary significantly depending upon the hyper involved in the I/O. This can also be true, although the effect is smaller, depending upon the disk involved in the I/O. Thus, there can be a balanced system and yet all the LUNs for one FA, for example, are mapped to only hypers 0 and the LUNs for another FA can be mapped to hypers 2. This is undesirable because the measured FA performance could vary significantly depending upon the FA selected in the test. The method adjusts the hyper and disk assignments so that the system is also balanced across hypers, disks, and hypers within disks, where the hypers and disks are not considered as part of the hierarchy. This balance will be referred to as "marginal balance". To make the distinction between hierarchical and marginal balance clearer, consider the example system in which there are 48 hypers in total with 3 hypers per disk. Hierarchical balance means that the assignments are balanced across the 48 hypers in the system. Marginal balance means the assignments are balanced across each of the 3 hyper types, 0, 1, and 2.

When running single disks, that is, a system which maps a LUN at a host to a single disk hyper, configuring the system means defining a 1:1 map from the LUNs to the hypers, that is, each LUN is uniquely associated with 1 hyper. This is in contrast to RAID 1 (mirroring) in which each LUN is associated with two hypers. For single disks, referring to FIG. 6, the system is configured by sequentially assigning the LUNS in a left to right order in the configuration illustrated in FIG. 5. That is, LUN 1 on port A of processor a on FA 13, is assigned first, at 200, followed by LUN 2 on port A of processor a on FA 13, and so on, continuing from left to right across the LUNs in FIG. 5. Conceptually each LUN is, assigned to a hyper, at. 210, by proceeding down the back-end hierarchy in FIG. 4, taking the leftmost path such that the resulting cumulative assignment at that level of the hierarchy is as balanced as possible. For the system defined by FIGS. 4 and 5, this means that the first LUN is assigned to the odd bus, DA 1, DA processor a, DA port C, disk 1, hyper 0. The second LUN is assigned to the even bus, DA 2, DA processor a, DA port C, disk 1, hyper 0. The third LUN is assigned to the odd bus, DA 1, DA processor b, DA port C, disk 1, hyper 0. The fourth LUN is assigned to the even bus, DA 2, DA processor b, DA port C, disk 1, hyper 0. The fifth LUN is assigned to the odd bus, DA 2, DA processor a, DA port D, disk 1, hyper 0, and so on. Assigning LUNs to hypers in this manner assures that after each assignment the total number of LUNs assigned to each bus, DA, DA processor, DA port, disk, and hyper, differ by at most 1, that is, the assignment is balanced across each level of the hierarchy. For example, after 11 LUNs have been assigned in the example system, 6 assignments have been made to the odd bus and 5 to the even bus. Similarly 3 assignments have been made to DA 1 processor a, DA 1 processor b, and DA 2 processor a; and 2 assignments have been made to DA 2 processor 2. The output of this process is a matrix, X, with columns for the FA (or SA for SCSI), the FA (or SA) processor, FA (or SA) port, DA, DA processor, DA port, disk, and hyper where the rows are ordered in the left to right order of the LUNs in FIG. 4.

Figure 6:
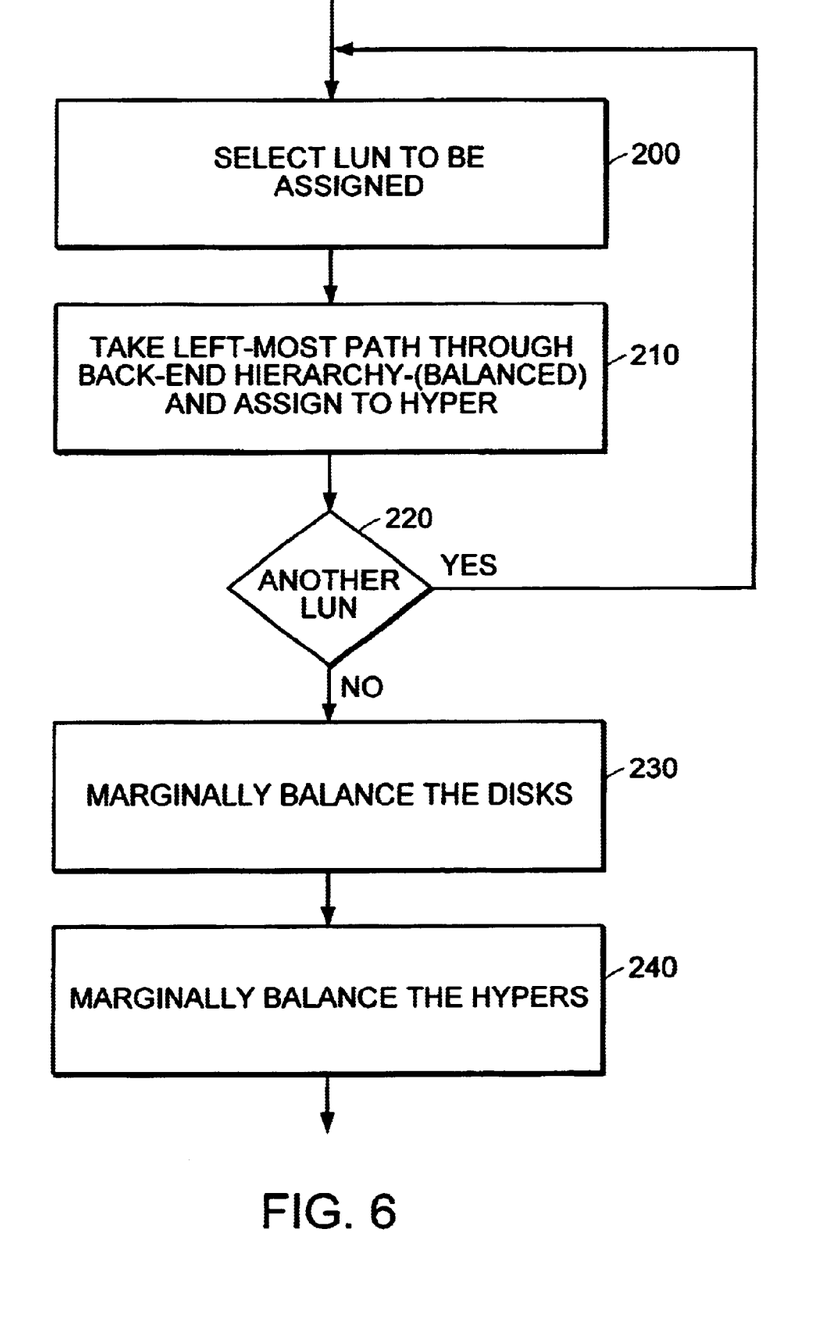
FIG. 6 shows a more detailed flow chart in accordance with the invention.

After the processing described above, as checked at 220, the system is balanced across the hierarchy but is not necessarily marginally balanced across disks and hypers. For example, with this assignment the hypers 0 are assigned first followed by the hypers 1, the hypers 2, and so on (if there were more). In the example system, all of the LUNs for FA 13 are mapped to hypers 0 and all of the LUNs for FA 16 are mapped to hypers 2. To address the requirement of marginal balance across disks and hypers, the disks and hypers are remapped, disks first and then hypers, in the order defined by the rows of the matrix X created in the first hierarchical balancing step. This is equivalent to proceeding down the disk column and then down the hyper column in X and making the changes described below to achieve marginal balance. These changes can be considered a relabeling of the hypers on each disk and of the disks on each DA port, from which it follows that the hierarchical balance across disks and hypers is maintained.

Disk reassignment is effected first. The goal of disk reassignment is to achieve marginal balance across disks while retaining hierarchical balance. Reiterating, the problem with the assignment as defined by 200 through 220 is that if there are P DA ports and D disks per DA port then the first P LUN assignments are made to disks numbered 1 on each of the P DA ports, the second P LUN assignments are made to disks numbered 2 on each of the P DA ports, and so on until the D-th P LUN assignments are made to disks numbered D on each of the P DA ports. The process is repeated until all LUNs have been assigned. Since the order of LUN assignments is right to left across the LUNs in the front-end hierarchy, the disks will not be marginally balanced. One way to achieve marginal disk balance would be to assign the first D LUNs to disks 1 through D and to repeat this process until all LUNs have been assigned. The difficulty with this approach is that after each set of P assignments, when the next assignment will be to a disk on the first DA port assigned to (in the example this would be DA 1, processor a, port C), it may be that the next disk number to assign to might cause hierarchical disk imbalance, or may not even be possible because all hypers on the selected disk have already been used. The algorithm for disk reassignment tries to prevent either of these two things from happening.

If P is the number of DA ports, then disk reassignment is actually done in groups of P, one disk assignment for each DA port. The first DA port assigned to has a special place in this procedure. Once the disk on the first DA port assigned to is selected the subsequent P-1 assignments are obtained by incrementing the previous assignment by 1, except that the next assignment after D, the number of disks per port, is 1. Thus if there were 8 DA ports, 5 disks per port, and the disk selected for the first DA port assigned to is 3 then the P assignments are 3,4,5,1,2,3,4,5. This procedure of making the sets of P assignments insures hierarchical balance.

The choice of which disk to assign, when assigning a disk to the first DA port assigned to, is based on two sets, A and B. A is the set of disk numbers (a subset of {1,2,3, . . . ,D}) with counts equal to the minimum for the entire system. Selecting a disk number from A will maintain marginal disk balance, in so far as possible, for this assignment and the subsequent P-1 assignments. The set B is the set of disk numbers with assignment counts equal to the minimum across the first DA port assigned to. Selecting a disk number from B will maintain marginal disk balance for the first DA port assigned to, and, because of the way the next P-1 assignments are made, marginal disk balance for each DA port. The method calls for making a selection to maintain marginal disk balance across the system and each DA port. If that is not possible make a selection to maintain marginal disk balance across all DA ports.

The marginal balancing aspect of the invention thus operates as follows (steps 230 and 240). Assume there are a total of P DA ports in the system, D disks per port, and H hypers per disk. In our example system P is 8, D is 2, and H is 3. In general the hierarchical balancing process described above first assigns (at 230) to the disks labeled "1," then to the disks labeled "2" and continues until finally it assigns to disk "D." This pattern in repeated H times (for the H hypers per disk). (In the example system, the assignment is 8 disk 1's followed by 8 disk 2's and this is repeated 3 times.) In the modified version of the method, to achieve marginal balancing, for the first P assignments, the kth assignment is made to disk (k−1)mod(D)+1 for k=1,2,3, . . . , P. In the example, the first 8 disk assignments are to disks 1,2,1,2,1,2,1,2. At this point in the process, each DA port has had 1 of its disks assigned and the assignment is marginally balanced across disks, that is, 4 disk 1's and 4 disk 2's have been assigned.

To make the next P assignments, the method determines marginal disk counts across the system and across the first DA port assigned. The two sets, A and B, are examined. (A is the set of disks with assignment counts equal to the minimum count across the system and B is the set of disks with assignment counts equal to the minimum count across the first DA port assigned.) If the intersection of these two sets is not a null set, then the minimum disk number in the intersection is selected. If the intersection is a null set, them the minimum disk number in the set B is selected.

Assume that the selected number is j. Then the second set of P disks to be assigned is given by (k+j−2)mod(D)+1, for k=1,2,3, . . . , P.

In the illustrated example, after the first 8 assignments, 4 have been made to disks labeled 1 and 4 to disks labeled 2. The set A={1,2}. The first disk to be assigned was disk 1 on DA 1, processor a, port C. The disk with the lowest (minimum) disk count on DA 1, processor a, port C, is disk 2, since disk 1 has an assignment count of 1 and disk 2 has a count 0. Therefore B={2}. The intersection of these two sets is {2}, and hence j equals 2, and the next 8 disk assignments are to disks (k)mod(2)+1. For k=1,2, . . . , 8. This means disks 2,1,2,1,2,1,2,1. The process for the second set of P assignments is repeated for subsequent sets of P assignments until all disks have been reassigned.

To help clarify the disk reassignment procedure at 230, suppose that example system was the same as before except that there were 3 disks per DA processor port. The first eight disk assignments would now be 1,2,3,1,2,3,1,2. At this point 3 disk 1's, 3 disk 2's, and 2 disk 3's have been assigned in the system. The minimum disk assignment count in the system is 2, and disk 3's are the only disks having that minimum count, and the set A={3}. Only one disk, disk 1, has been assigned to the first DA port, and therefore B={2, 3}. The intersection of A and B is {3} and since the set contains only 1 value the minimum disk number is 3. The next 8 assignments are 3,1,2,3,1,2,3,1. After these assignments, 6 disk 1s, 5 disk 2s, and 5 disk 3s have been assigned. Therefore, A={2,3}. Disk 1 and disk 3 have been assigned on the first port assigned to so B={2). The intersection of A and B is now {2}, the minimum is 2, and the next 8 assignments are 2,3,1,2,3,1,2,3.

The reassignment of hypers, at 240, is done in a similar fashion, except now three count distributions are maintained and updated as assignments are made. The objective is marginal balance of hypers and also marginal balance across disk/hyper combinations. Three types of sets of hyper numbers are maintained. A set "C" of unassigned hypers is maintained for each disk in the system. Since only one LUN can be assigned to a hyper, when a hyper is to be selected on a disk the hyper must be selected from the set C. For marginal hyper balance a table is maintained of the number of current reassignments to each hyper number. If there are H hypers per disk, numbered, for example, 0,1,2,. . . ,(H−1), then the table has H entries and the I-th entry is the number of reassignments to hyper (I−1). A set "B" is the set of hyper numbers with the least number of reassignments in the table. The next hyper number selected should be from set B to maintain the best possible marginal hyper balance. For marginal disk/hyper combination balance, a table of currently reassigned hyper numbers is maintained for each disk number in the system. If there are D disks on each DA port then D tables are maintained. Suppose the D disks are numbered 1,2, . . . ,D. Then the I-th table has H entries, assuming that there are H hypers per disk, and the J-th entry is the number of reassignments to hyper number (J−1). A set "A" of hyper numbers with minimum reassignment counts is maintained for each of these D tables. When reassigning a hyper from a disk with number I, A is the set of hyper numbers that one should select from to maintain hyper balance across disks with number I.

When reassigning a hyper, the appropriate A, B, and C sets are looked at. If the intersection of A, B, and C is not empty, then a hyper number from the intersection is selected so that all three criteria are satisfied. If the intersection is empty, then a hyper number from the intersection of B and C is selected if possible. If the intersection of B and C is empty, then a selection from C is made.

Thus the three sets, and corresponding distributions, are ordered A<B<C in terms of increasing importance of balance and the algorithm reassigns the hyper to j where if (ABS is not null) j=min(I in ABC)

else if (BC is not null) j=min(I in BC)

else j=min(I in C)

In most systems which have been encountered, the result of steps 200 through 240 produces an assignment which is hierarchically balanced and also marginally balanced across disks, hyper, and disk/hyper combinations. A sequence of cross tabulations of assignment counts to check the hierarchical balance across all levels of the front-end and back-end hierarchies, and the marginal disk, hyper, and disk/hyper combination balance indicates that in a few cases there has not been the desired marginal balance, and in particular, there has not been hyper balance. Since the performance impact of the hyper on a disk is much more important than the performance impact of the disk on a DA port, hyper balance is much more important than disk balance. In those cases where there is a problem with hyper balance, the procedure is repeated without attempting to marginally balance the disks. This is done by using steps 200 through 220 to get the initial assignments and then using the method in step 230, applied to the hyper level of the back-end hierarchy, to marginally balance the hypers.

In a RAID 1 system, each LUN is mapped to 2 hypers, designated M1 and M2. In order to apply a method of the invention to the full system, to achieve a balanced configuration, one would need to know the MI: M2 mapping and the problem of achieving balance would be substantially more difficult. An alternative approach for RAID 1 is to apply the method of the invention described above, for a single disk, to half the system, that is, the system consisting of the first half of the disks on each DA port. For example, if there were 6 disks per DA port then the algorithm would be applied to a system with disks 1, 2, and 3 on each DA port. This will result in a balanced assignment for half the system, including both M1 and M2 hypers. In all actual systems considered, this balanced assignment to half the system results in a balanced assignment for the whole system. This relies on certain properties of the M1:M2 map.

Once the configuration mapping of LUN's to hypers is complete, the configuration data is used by the master host for performing performance evaluations as described, for example, in U.S. Pat. No. 5,953,589, issued Sep. 14, 1999, entitled BENCHMARK TOOL FOR A MASS STORAGE SYSTEM and U.S. Pat. No. 5,898,863, issued Apr. 27, 1999, entitled METHOD AND APPARATUS FOR DETERMINING I/O SIZE DISTRIBUTION OF AN INPUT/OUTPUT SYSTEM AND ITS USE FOR LOAD SIMULATION, which are hereby incorporated, herein, in their entirety.

Additions, subtractions, and other modifications of the illustrated embodiment of the invention will be apparent to those practiced in this field and are within the scope of the following claims.

What is claimed is:

1. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of LUN's across the back-end hierarchy, and marginally balancing assignments of disk drive elements and hypers of the disk drive elements across the back-end hierarchy, wherein, said marginally balancing of said drive elements comprises monitoring a first set of disk numbers with counts equal to the minimum for the entire system, monitoring a second set of disk numbers with assignment counts equal to a minimum across the first disk adaptor port to be assigned, and selecting, if possible, a disk member from an intersection of the first and second set.

2. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of LUN's across the back-end hierarchy, and marginally balancing assignments of disk drive elements and hypers of the disk drive elements across the back-end hierarchy, wherein said marginally balancing of said hypers comprises monitoring a first set of hyper numbers with minimum reassignment counts for each of a plurality of tables, each table containing the currently reassigned hyper numbers for each disk number in the system, monitoring a second set of hyper numbers with the least number of reassignments in a table having the number of current reassignments for each hyper number, monitoring a third set of unassigned hypers for each disk in the system; and selecting a hyper maintaining a priority of the first set, the second set, and the third set, wherein a preferred hyper is contained in, in priority sequence, an intersection of all three sets, the second and third set, and the third set.

3. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of LUN's across the back-end hierarchy, and marginally balancing assignments of disk drive elements and hypers of the disk drive elements across the back-end hierarchy, wherein, if the marginally balancing step does not maintain a marginal balance across the hypers, marginally balancing solely upon the hypers of the disk drive elements across the back-end hierarchy.

4. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of components of the back-end hierarchy to LUN's of the front-end hierarchy, and marginally balancing said assignment, wherein said marginally balancing of said drive elements comprises monitoring a first set of components with counts equal to the minimum for the entire system, monitoring a second set of components with assignment counts equal to a minimum across a first port to be assigned, and selecting, if possible, a component from an intersection of the first and second set.

5. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of components of the back-end hierarchy to LUN's of the front-end hierarchy, and marginally balancing said assignment, wherein said components include a lowest level component, and said marginally balancing of said lowest-level components comprises monitoring a first set of lowest level component numbers with minimum reassignment counts for each of a plurality of tables, each table containing the currently reassigned lowest component numbers for each next higher level component number in the system, monitoring a second set of lowest level component numbers with the least number of reassignments in a table having the number of current reassignments for each lowest level component number, monitoring a third set of unassigned lowest level components of a next higher level component in the system; and selecting a lowest level component maintaining a priority of the first set, the second set, and the third set, wherein a preferred lowest level component is contained in, in sequence, an intersection of all three sets, the second and third set, and the third set.

6. A method for automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the method comprising balancing assignments of components of the back-end hierarchy to LUN's of the front-end hierarchy, and marginally balancing said assignment, wherein, if the marginal balancing step does not maintain a marginal balance across the lowest level components, marginally balancing solely upon the lowest level components across the back-end hierarchy.

7. Software stored on a computer readable medium, to perform the function of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of LUN's across the back-end hierarchy, and marginally balancing assignments of disk drive elements and hypers of the disk drive elements across the back-end hierarchy, where in said function of marginally balancing said drive elements comprises monitoring a first set of disk numbers with counts equal to the minimum for the entire system, monitoring a second set of disk numbers with assignment counts equal to a minimum across the first adaptor port to be assigned, and selecting, if possible, a disk member from an intersection of the first and second set.

8. Software stored on a computer readable medium, to perform the function of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of LUN's across the back-end hierarchy, and marginally balancing assignments of disk drive elements and hypers of the disk drive elements across the back-end hierarchy, wherein said function marginally balancing said hypers comprises monitoring a first set of hyper numbers with minimum reassignment counts for each of a plurality of tables, each table containing the currently reassigned hyper numbers for each disk number in the system, monitoring a second set of hyper numbers with the least number of reassignments in a table having the number of current reassignments for each hyper number, monitoring a third set of unassigned hypers for each disk in the system, and selecting a hyper maintaining a priority of the first set, the second set, and the third set, wherein a preferred hyper is contained in, in priority sequence, an intersection of all three sets, the second and third set, and the third set.

9. Software stored on a computer readable medium, to perform the function of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of LUN's across the back-end hierarchy, and marginally balancing assignments of disk drive elements and hypers of the disk drive elements across the back-end hierarchy, wherein, if the marginally balancing function does not maintain a marginal balance across the hypers, marginally balancing solely upon the hypers of the disk drive elements across the back-end hierarchy.

10. Software stored on a computer readable medium to perform the functions of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of components of the back-end hierarchy to LUN's of the front-end hierarchy, and marginally balancing said assignment, wherein said marginally balancing function of said drive elements comprises monitoring a first set of components with counts equal to the minimum for the entire system, monitoring a second set of components with assignment counts equal to a minimum across a first port to be assigned, and selecting, if possible, a component from an intersection of the first and second set.

11. Software stored on a computer readable medium to perform the functions of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of components of the back-end hierarchy to LUN's of the front-end hierarchy, and marginally balancing said assignment, wherein said components include a lowest level component, and said function of marginally balancing said lowest-level components comprises monitoring a first set of lowest level component numbers with minimum reassignment counts for each of a plurality of tables, each table containing the currently reassigned lowest component numbers for each next higher level component number in the system, monitoring a second set of lowest level component numbers with the least number of reassignments in a table having the number of current reassignments for each hyper number, monitoring a third set of unassigned lowest level components of a next higher level component in the system; and selecting a lowest level component maintaining a priority of the first set, the second set, and the third set, wherein a preferred lowest level component is contained in, in sequence, an intersection of all three sets, the second and third set, and the third set.

12. Software stored on a computer readable medium to perform the functions of automatically configuring a mass storage system for measuring system performance, the system comprising a plurality of disk storage elements, each element having at least one hyper and connected to a disk storage controller, the disk storage controller being connected to at least one host computer, the host computer defining a plurality of logical units (LUN's), the storage controller defining in its configuration a front-end hierarchy and a back-end hierarchy, the functions comprising balancing assignments of components of the back-end hierarchy to LUN's of the front-end hierarchy, and marginally balancing said assignment, wherein, if the marginal balancing function does not maintain a marginal balance across the lowest level components, marginally balancing solely upon the lowest level components across the back-end hierarchy.

* * * * *